US008495484B2

United States Patent
Ahmed et al.

(10) Patent No.: US 8,495,484 B2
(45) Date of Patent: Jul. 23, 2013

(54) INTELLIGENT LINK POPULATION AND RECOMMENDATION

(75) Inventors: Maryam Ahmed, Vaughan (CA); Al Chakra, Apex, NC (US); Prasad Lakshmi Imandi, Chapel Hill, NC (US); Michael Scott Thomason, Raleigh, NC (US); Tong Yu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/196,600

(22) Filed: Aug. 2, 2011

(65) Prior Publication Data

US 2013/0036344 A1 Feb. 7, 2013

(51) Int. Cl.
*G06F 17/20* (2006.01)
*G06F 17/21* (2006.01)
*G06F 17/22* (2006.01)
*G06F 17/23* (2006.01)

(52) U.S. Cl.
USPC ............ 715/205; 715/206; 715/207; 715/208

(58) Field of Classification Search
None
See application file for complete search history.

(56) References Cited

U.S. PATENT DOCUMENTS

| 6,370,355 | B1 * | 4/2002 | Ceretta et al. ................. 434/350 |
| 6,415,319 | B1 * | 7/2002 | Ambroziak .................... 709/219 |
| 6,507,410 | B1 * | 1/2003 | Robertson et al. ........... 358/1.18 |
| 7,158,986 | B1 | 1/2007 | Oliver et al. |
| 7,428,536 | B2 * | 9/2008 | McGuire et al. ...................... 1/1 |
| 7,665,083 | B2 | 2/2010 | Demant et al. |
| 7,809,708 | B2 * | 10/2010 | Aridor et al. .................. 707/706 |
| 8,176,120 | B2 * | 5/2012 | Rosenstein et al. ........... 709/203 |
| 2002/0083093 | A1 | 6/2002 | Goodisman et al. |
| 2003/0158953 | A1 * | 8/2003 | Lal ................................. 709/230 |
| 2003/0171944 | A1 * | 9/2003 | Fine et al. .......................... 705/1 |
| 2003/0208472 | A1 * | 11/2003 | Pham ................................. 707/2 |
| 2005/0262428 | A1 | 11/2005 | Little et al. |
| 2006/0041843 | A1 | 2/2006 | Billsus et al. |
| 2006/0059144 | A1 * | 3/2006 | Canright et al. .................... 707/5 |
| 2006/0059225 | A1 | 3/2006 | Stonehocker et al. |
| 2006/0085734 | A1 * | 4/2006 | Balnaves ....................... 715/512 |

(Continued)

FOREIGN PATENT DOCUMENTS

WO    WO 00/07133    2/2000

OTHER PUBLICATIONS

Tyson. "Excerpts from Microsoft Word 2010 Bible (sections 7.3 and 40.2)". Copyright Date: Jun. 21, 2010.*

*Primary Examiner* — Laurie Ries
*Assistant Examiner* — Soumya Dasgupta
(74) *Attorney, Agent, or Firm* — Hamilton, Brook, Smith & Reynolds, P.C.

(57) ABSTRACT

Computer apparatus, system and method maintain a database of hyperlinks associated with activities and inactions in the past of a user. From a current work space of the user, a recommendation engine searches the database to retrieve hyperlinks based on user-specified context and topic. The recommendation engine displays recommended hyperlinks (candidates) and enables the user to filter the recommended hyperlinks by original source, activity metric or other relevance. To form and maintain the database, a context analysis engine captures activity content links. Each activity content link has a respective hyperlink associated with an activity/inaction of the user. The context analysis engine generates a metric based on the activity and records the respective hyperlink in the database along with the metric. The recommendation engine and context analysis engine may, on user command, further search social media or social networks in order to make hyperlink recommendations to the user.

20 Claims, 8 Drawing Sheets

U.S. PATENT DOCUMENTS

| | | |
|---|---|---|
| 2006/0136357 A1 | 6/2006 | Rasmussen et al. |
| 2007/0244977 A1 | 10/2007 | Atkins |
| 2008/0010136 A1* | 1/2008 | Yu .................................. 705/14 |
| 2008/0276219 A1* | 11/2008 | McGuire et al. .............. 717/107 |
| 2009/0158176 A1* | 6/2009 | Kalaboukis et al. ........... 715/758 |
| 2009/0235158 A1* | 9/2009 | Rosenstein et al. ........... 715/234 |
| 2011/0119286 A1* | 5/2011 | McGuire et al. .............. 707/767 |
| 2011/0161178 A1* | 6/2011 | Rosenstein et al. ......... 705/14.69 |
| 2011/0295594 A1* | 12/2011 | Cai et al. ............................ 704/9 |
| 2012/0072422 A1* | 3/2012 | Rollins et al. .................. 707/737 |
| 2012/0123673 A1* | 5/2012 | Perks et al. .................... 701/426 |
| 2012/0123674 A1* | 5/2012 | Perks et al. .................... 701/426 |
| 2013/0067303 A1* | 3/2013 | Kantor et al. .................. 715/205 |
| 2013/0073935 A1* | 3/2013 | Bertot et al. ................... 715/205 |

* cited by examiner

INTELLIGENT LINK POPULATION AND RECOMMENDATION

BACKGROUND OF THE INVENTION

Looking through many web pages and other documents such as Lotus Notes® documents can be time consuming when researching a topic of interest. The research may be intermittent, so stopping and starting an application to track what a user views and the associated hyperlinks is not optimal since the user may forget to stop or start the application while multi-tasking In the case where a user creates presentations, emails or instant messages and needs to find a hyperlink that the user has viewed before, it is very time consuming for the user to find it or a reference (content) containing it. If the user has not visited a particular linked content, then the user cannot employ certain techniques that pull in dynamic results.

Example Scenario

John is a project manager and is managing multiple projects. During communications (chat, email, presentations) with each project team, John constantly finds himself giving references to past emails, such as work discussions including website references, which makes for an effective communication. To minimize the time spent in finding these past references, John could benefit from a system that provides contextual references to recent discussions on a specific project topic. This would allow John to spend his time on the current task rather than searching for references needed for his communication if such a system existed.

Thus there is a need for a system that provides contextual references to recent discussions.

SUMMARY OF THE INVENTION

The following disclosure describes a system, method, and a recommendation engine that generates hyperlinks and link recommendations and that populates such links in a user's current work space (e.g., a document, electronic message, other communication or electronic content). Building on the current art of analytics and capturing users' activities (including passive receipt of hyperlinks in emails, instant messages, social networks, social bookmarks and the like) embodiments apply activity metrics and convert plain text into intelligent links selectably useable by the user. The basis for the link recommendation can include the user's current activity and a content analysis of the topic. In one embodiment, the recommendation engine uses user-highlighted keywords as input to the function for recommending and adding a link. In another embodiment, the recommendation engine uses the user-highlighted keywords as input to a social media search request to find links based on keyword. The recommendation engine provides the most logical link options from which the user can select then the recommendation engine substitutes the current user-highlighted text (work area) with the appropriate hyperlink.

In particular, embodiments of Applicants' disclosure intelligently recommend hyperlinks to a user to insert into the content he is currently creating (composing). The recommendations in Applicants' disclosure can be dynamic or personalized based on (i) the user's prior document/page/message viewing activities (e.g., visited web pages and the content on those web pages), (ii) the topics/contexts associated with those activities, (iii) activity metrics (e.g., how long the user viewed the page), and (iv) topic of the current content the user is creating (as indicated by user selected keywords or series of words). The invention system displays recommended hyperlinks to the user and allows the user to choose which hyperlink is most relevant. Furthermore, the choice of the user adds weight to the selected hyperlink for subsequent fetches for recommendations.

The user is also provided an interface to further personalize the link recommendations, such as configuring which search engine is used for dynamic results (i.e., search of social networking sites or other online social media), or configuring a rule of what not to include in results (i.e., web pages the user visited for less than 1 minute duration). The notion of personalization is based on the user's viewing/activity habits. Basing the possible hyperlink recommendations on prior user activity such as a user viewing a document/page/message or how long the document/page/message was viewed, results in unique recommendations for each user. This is true for hyperlinks in prior instant messages or emails, as well as hyperlinks in prior documents, web pages, electronic content, search results, etc.

Accordingly embodiments of the present invention generally have the following features or aspects:

utilization of metrics surrounding the exposure to/visits of a hyperlink (i.e., how long the user viewed the content or if he viewed it at all);

inclusion of hyperlinks that the user received/sent in communication methods (such as emails or instant messages) where such methods may be separate and distinct from the user's current work space method;

an interface for users to customize or filter generated link recommendations based on the users' respective habits or activities (e.g., duration of visit);

customization of results (link recommendations) based on user preferences;

an interface that allows the content creator/user to choose from recommended links displayed;

search options for searches by a social networking site, a social bookmarking system, a social media site, etc., which would be more personalized; and an option of selecting a combination of fragmented keywords that the system processes together in sum total as one topic/context. The identification of such fragmented keywords could be based on specific font, color, or user's highlights.

In contrast, U.S. Publication No. 2007/0244977 by Quixote Atkins proposes that the user selects the source of the link. For example, if the embedded link is to a video, the user needs to search his computer and select the video as the item he would like to embed into subject content. In response, the system converts the file pathname of the video into a link in the subject content. This is contrary to what Applicants propose, namely that a recommendation is made from a list of possible sources based on a relevancy algorithm which removes the user's need to search the internet, his computer, etc.

U.S. Pat. No. 7,665,083 by Demant, et al. discloses users taking action on backend data elements based on text elements. For example, paragraph [0019] shows how Demant et al. are using "John Smith" and are able to perform actions on John Smith from any application such as send an email, post a chat communication, etc. In contrast, Applicants' disclosure and Applicants are focused on one system which intelligently recommends possible links to insert into a document, email, chat communication, etc., based on the topic of the user's current work space. The topic of the user's current work space is based on topic or keywords selected by the user.

In U.S. Publication No. 2002/0083093 by Aaron A. Goodisman et al., the user runs a document through a linkify engine. The linkify engine dynamically creates all possible hyperlinks associations. Such hyperlink associations are not based on (i) the user's personalized settings, (ii) metrics around the exposure to/visits of hyperlinks, and (iii) hyperlinks received in emails or in chat sessions or social networking site search results of keyword(s) selected by the user in contrast to Applicants' invention. Nor does the Goodisman system provide to the content creator intelligent recommendations based on the creator's prior activities and activity metrics in contrast to the present invention. The content creator in Goodisman is not provided recommendations to choose from. The end user in Goodisman who views the linkified document can have different choices based on his or her job role, actions etc.

Applicants' dynamic context filtering of a content creator-user's current work is the basis for the dynamic search for potential links. In contrast, the results in Goodisman are based on document viewers' activities rather than the document creator's activities. Goodisman paragraph [0009] indicates link activation to pull in data objects associated with the link, and does not automatically populate a link. This activation is by the viewing end user, not the content creator.

Goodisman paragraph [0012] does not allow the user to choose the blocks, text or series of words, nor does it present the user with a list of potential matches. The Goodisman approach programmatically provides the output without the user's interaction. The linkages may or may not be relevant. Also, end users have different choices when viewing a linkified document. Goodisman paragraph [0030] focuses on how a user viewing a linkified document can utilize the multiple linkages. Note, this is after the document is created. In contrast, Applicants are not giving the linkified document viewer choices. Applicants are focused on producing recommendations to the content creator and prompting the content creator-user to manually select from a generated list of potential linkages.

U.S. Publication No. 2006/0136357 by David Rasmussen et al. creates associations between an activity (such as a phone call) and user actions (visiting a webpage, sending an email, etc) during that activity. Based on these associations, linkages can later be seen with respect to a particular activity. The Rasmussen system requires an object tracking module to be started and stopped. This is not a continuous process as in Applicant's present invention. In Rasmussen, the object tracking module is associated with a variety of different application programs. It establishes relationships between different types of data objects associated with the application programs while a particular activity occurs. The object tracking module determines relevance by the number of links between objects or distance between objects. Input may also be taken as keywords. Rasmussen assumes all activity during the time frame is associated and focuses on correlating an activity (e.g., a meeting).

In Rasmussen paragraph [0026], associated notes are taken during the activity with the URL so that the user can later insert the URL into a formal document. Applicants are not requiring a user to start or stop any activity or even take notes to make associations for later retrieval of a URL.

In Rasmussen paragraph [0030], the object tracking module assigns a weight between objects to determine relevance. Applicants are not assigning weights until the user selects a recommended hyperlink; the selected link has more weight for the topic on subsequent fetches for recommendations.

Rasmussen paragraph [0031] further establishes the linkage between a client activity (phone call) and what the user does during the phone call. Applicants are associating the prior viewed hyperlinked content with a context and metrics such as how long the user viewed the linked content, etc. Applicants are not associating the prior viewed content (or that activity of viewing) with the current application activity or any other activity(ies) by the user. Applicants' invention captures activity content links that involve a respective hyperlink whether or not the user acts. Rasmussen paragraph further demonstrates the focus on associations between objects during a time frame since this allows the user to let the tracking module know that a particular piece is not related to the event. In contrast, Applicant's invention is not associating or making linkages between an activity/hyperlink/object in one application to an activity/object in another application within a time frame (or at all).

U.S. Publication No. 2005/0262428 by Chad M. Little et al. is focused only on webpage content. As the webpage is rendered, links related to keyword "candidates" are chosen programatically from the webpage content being served to a user. Little paragraph [0001] explains this is " . . . correlation of document text with web links and/or embedded dynamic content". Little paragraph [0024] explains the use of URL history, word relevance, phrase weighting metric etc., but those weights are used to derive the context weighting of the input to the context engine not the output relevance to personalize user filtering. Applicants' disclosure is different in that Applicants are using metrics surrounding the URL history. In addition, the hyperlinks included in the user's instant messages, emails, social media, social bookmarks etc. are not part of the available sources in Little but are in Applicants' invention.

Turning now to a preferred embodiment, provided is a computer-implemented method, apparatus or system of recommending a hyperlink (e.g., a list of hyperlinks) The method, apparatus, or system comprise:

maintaining a database of hyperlinks associated with activities in the past of a user (including passive activities or inaction);

receiving in a user interface a selection of text, the selection being by the user from a current workspace and indicative of or representative of a topic;

a recommendation engine extracting from the user's current workspace a context of said selection of text (topic);

the recommendation engine searching the database for hyperlinks based on at least the topic and context of said selection of text, wherein maintaining the database is by a context analysis engine:

(i) throughout different workspaces of the user, monitoring the workspaces and capturing different activity content links, each activity content link comprising a respective hyperlink associated with a respective activity of the user, and (ii) for each activity content link, generating a metric based on said respective activity, and wherein the current workspace is separate in time and space from the different monitored workspaces; and from results of said searching, the recommendation engine displaying to the user a recommended hyperlink based on said context and the metric of the respective activity associated with the hyperlink. The display to the user may be a list of one or more recommended hyperlinks.

The hyperlinks stored in the database and being from different activity content links include: URL history links, links in emails to the user, links in emails from the user, links in instant messages to the user, links in instant messages from the user, links in electronic communications (e.g., text messages, chat communications, and the like) to/from the user, links in social network content, links in social bookmarking content, links in other online social media and the like. The links in email messages, instant messages, chat or other electronic communications to the user may have been passively received by or ignored (not acted on) by the user. In this way, the database stores hyperlinks associated with inactions or passive actions as well as other activities in the past of the user.

Where the respective activity associated with the hyperlink is the user viewing a linked content, then the metric includes amount or duration of time the user spent viewing the content.

The selection of text may be user highlighted text in any of: a word processing document, a web page, an email message, a text message, an electronic presentation, an electronic communication and other electronic content.

The recommendation engine extracts a plurality of words before and after the selected text to form or otherwise determine context.

In accordance with one aspect of the present invention, the recommendation engine displays multiple recommended links ordered by the metric (in metric order) or filterable by the metric (able to be filtered by the user according to the metric).

In accordance with another aspect, the invention method/system further comprises: upon user command, searching a social networking site for hyperlinks relevant to the context, and displaying said hyperlinks as recommended hyperlinks to the user.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows. The teachings of all patents, published applications and references cited herein are incorporated by reference in their entirety.

Figure 6:
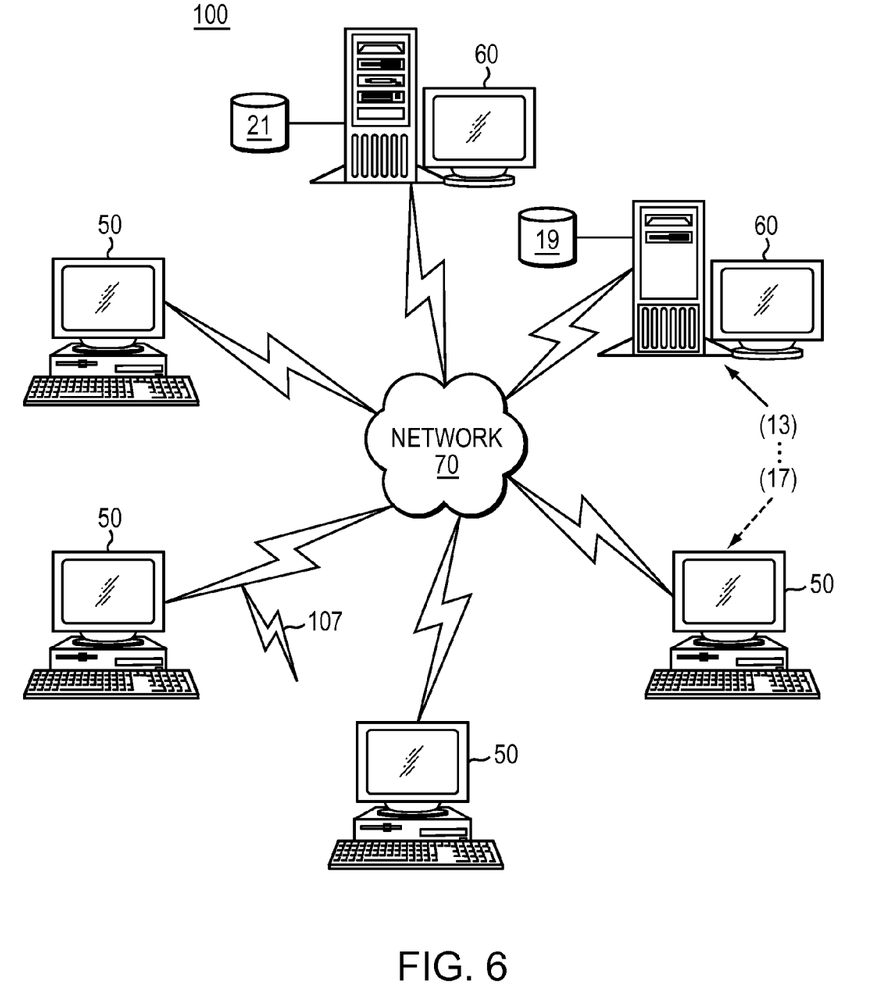
FIG. 6 is a schematic view of a computer network in which embodiments are deployed.

Embodiments include computer systems, apparatus and method that recommend and order hyperlinks optimal to the user's current working context (or computer work space), and that present the recommended links in a manner allowing insertion into an editor of the user work space. Preferably an embodiment 100 (as depicted in FIG. 6) is formed of a context analysis engine 13, a recommendation engine 17 and a database 19 of relevant links. The relevant links are hyperlinks (hypertext links) that the user has had prior experience with or has been previously exposed to, as will be made clear below.

The context analysis engine 13 builds over time and maintains the database 19 of relevant links. Also the context analysis engine 13 continuously monitors a user's computer-based activities and logs context of the user's work spaces (i.e., current focus/active application, as well as other opened tabs, windows, applications, sessions or the like). To accomplish the foregoing, the context analysis engine 13 uses a combination of mining, web spidering and word analytics.

Figure 3:
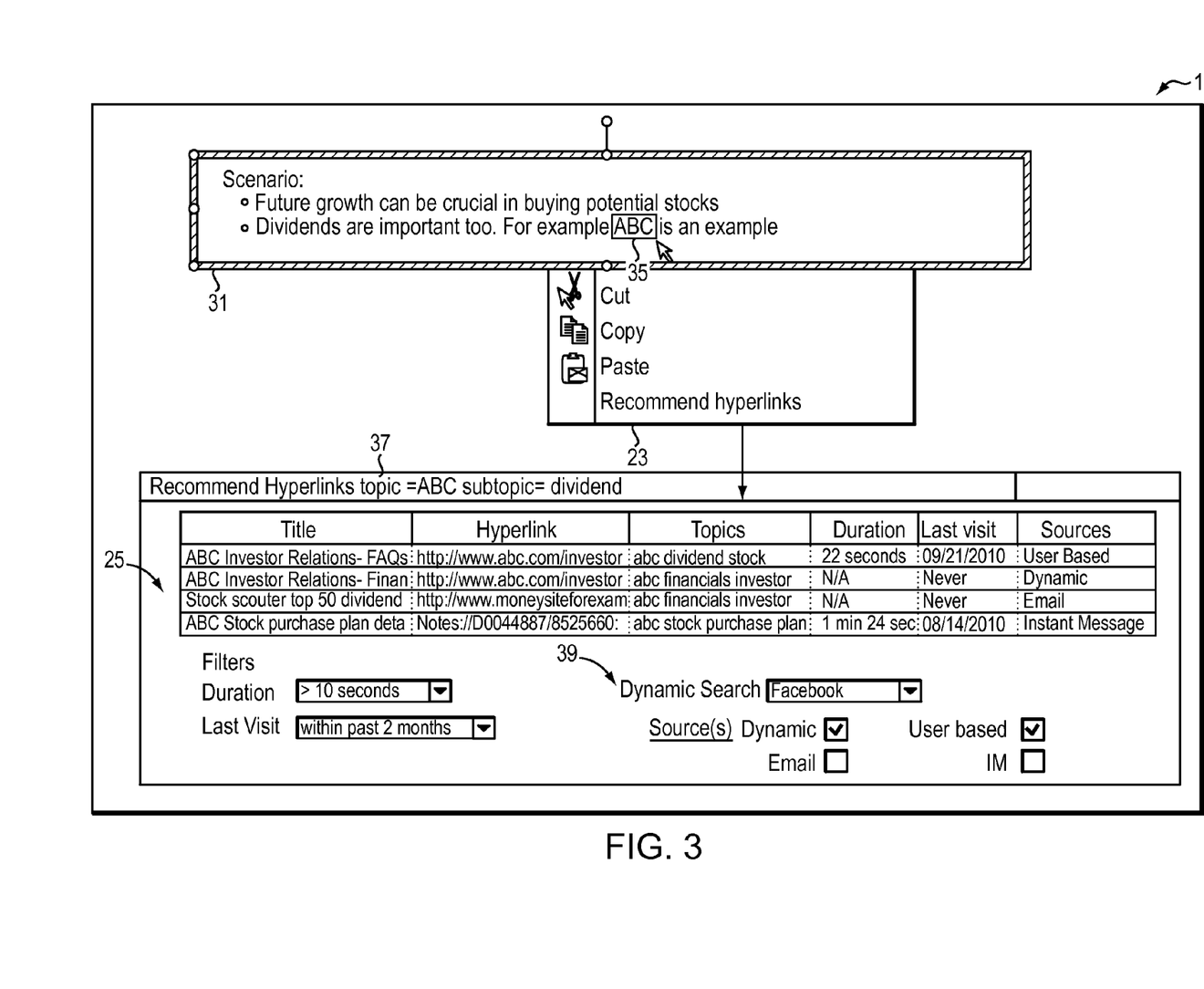
FIG. 3 is a schematic illustration of a recommendation engine interface in one embodiment.

In particular, the context analysis engine 13 continuously monitors and analyzes a computer user's environment (such as program applications that are in focus), referred to herein generally as the user's work space 31 (e.g., FIG. 3). The context analysis engine 13 keeps a running tally of keywords that summarize the user's current environment. Included are keywords that indicate what the user was looking at, what the user is now looking at, etc. Also the context analysis engine 13 analyzes and records indications of context and topic of any hyperlink in an application in focus regardless of the user clicking on or otherwise interacting with the link. For example, for a hyperlink in an instant message received by the user, the context analysis engine 13 records in database 19 indications of topic (keywords) of the hyperlink, context (e.g., neighboring words to the keywords in the content linked by the hyperlink), and associated information/data (e.g., instant message as source, name of sender, date/time, etc.), as well as records in the database record a copy of the hyperlink (i.e., the URL).

If the user clicks on, selects or otherwise interacts with the hyperlink appearing in his work space 31, the context analysis engine 13 gathers additional data from the user activity in order to derive relevance. This assumes that a user spends little time on an irrelevant link. The additional data gathered by context analysis engine 13 may include for non-limiting example, the amount of time spent viewing the linked content or duration of the visit, and the like. Preferably the context analysis engine 13 generates a metric based on the user activity. The metric may be in units of time, frequency, or other pertinent units.

In this way, the context analysis engine 13 captures activity content links of a user, where an activity content link comprises a hyperlink associated with an activity of the user. Example activity content links include, but are not limited to, URL history links, links in emails received/browsed by the user, links in IM's (instant messages), links in social network content, links in social bookmarking content, and the like.

The recommendation engine 17 performs computational operations to find candidate links in the database 19 to recommend to a user and that are optimal to the user's current work context (work space 31). The recommendation engine 17 presents to the user the candidate links in an intelligent order to allow insertion into an editor in the user's current work space 31. The recommendation engine 17 also allows user selection of a dynamic search of popular sites, like Facebook and Twitter, in order to further refine or limit the recommendation. Other social network sites or social media are suitable search targets.

Further details of the context analysis engine 13, recommendation engine 17 and database 19 are given below in example embodiments where FIG. 6 illustrates a computer network or similar digital processing environment in which embodiments of the present invention may be implemented.

In FIG. 6, client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60.

Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 7:
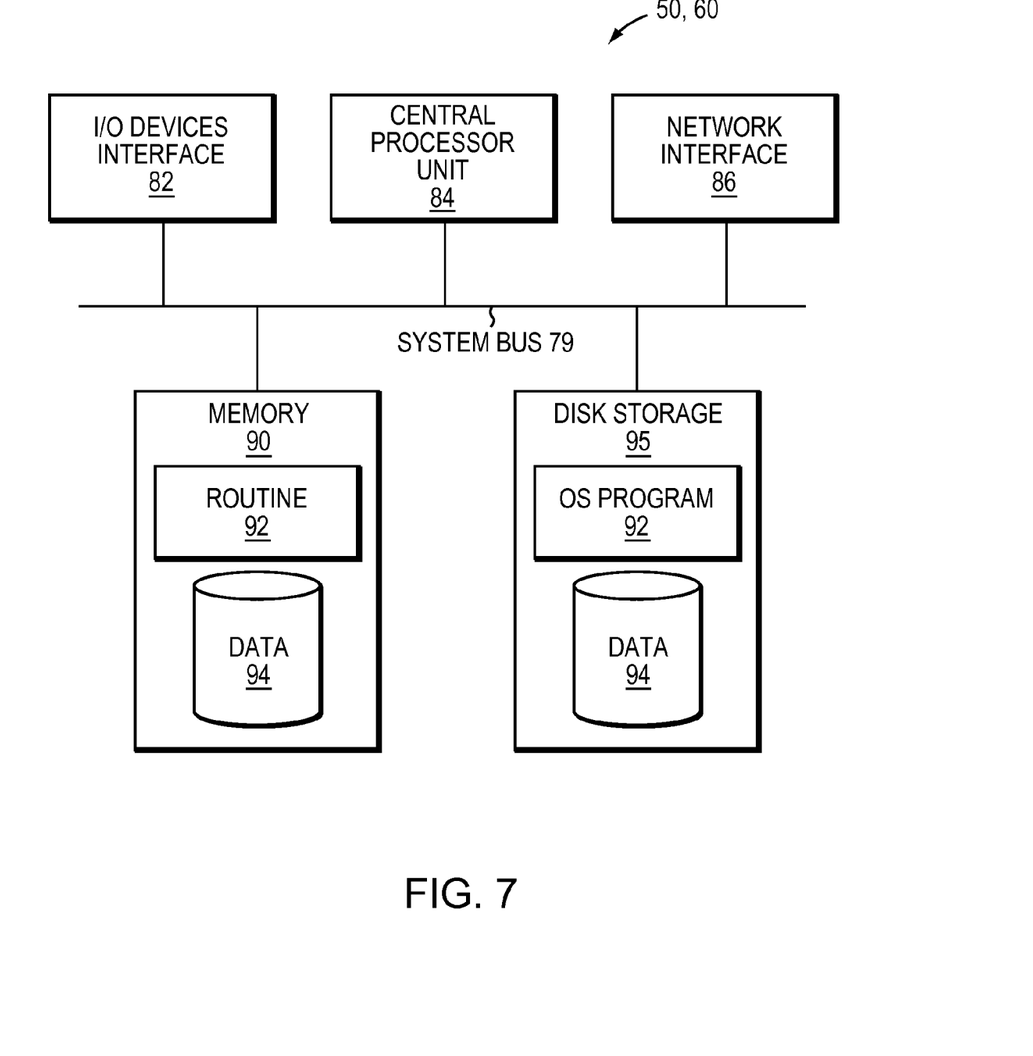
FIG. 7 is a block diagram of a computer node in the network of FIG. 6.

FIG. 7 is a diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 6). Memory 90 provides volatile storage for computer software instructions 92 and data 94 used to implement an embodiment of the present invention (e.g., context analysis engine 13, recommendation engine 17, database 19 and supporting code and user interface(s) detailed above and below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
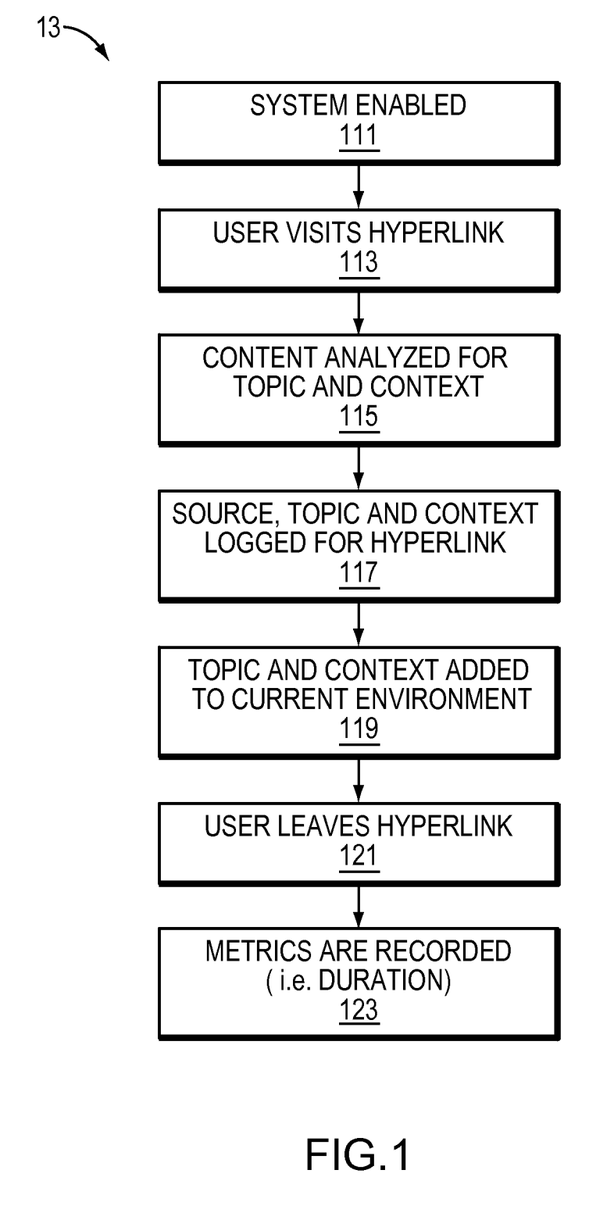
FIGS. 1 and 2 are flow diagrams of a context analysis engine process continuously analyzing user activity with, for non-limiting example, webpages and instant messages, respectively in embodiments of the present invention.
Figure 2:
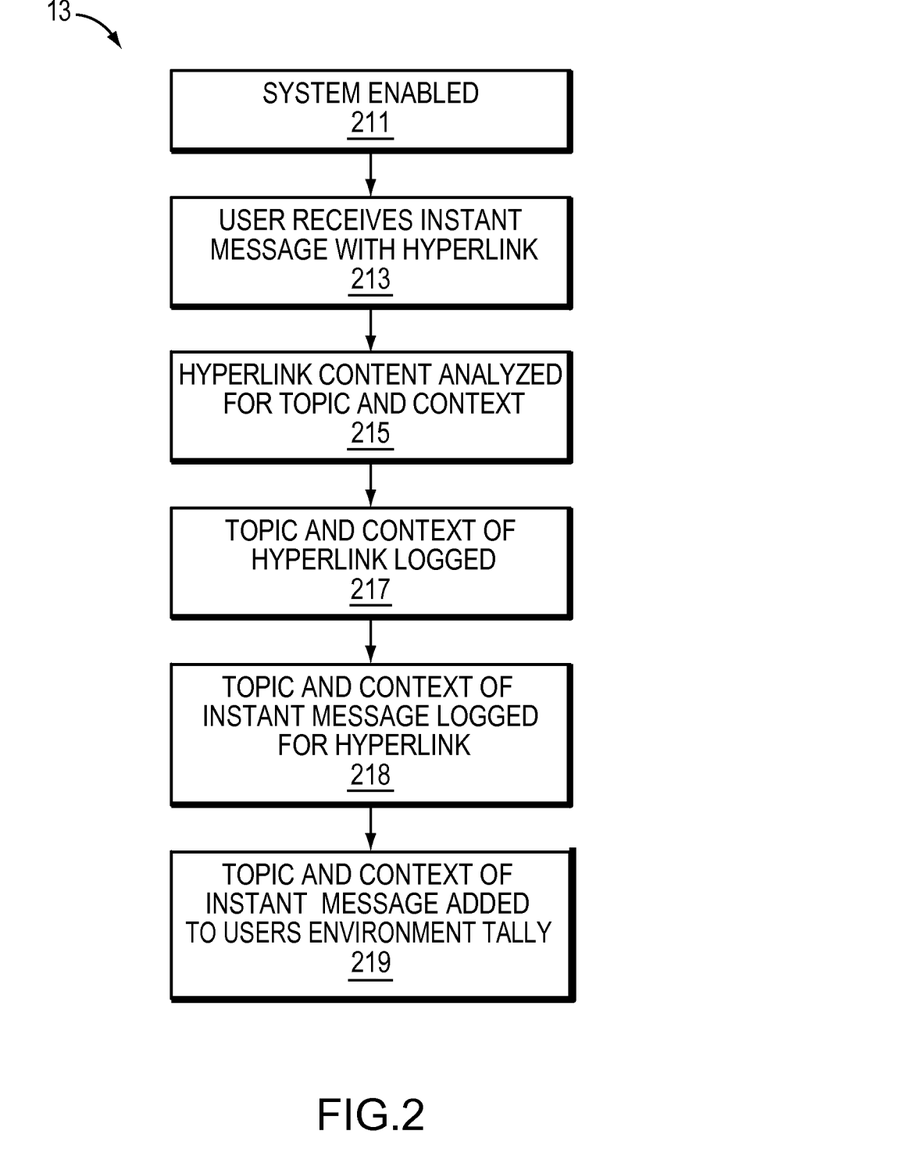

Referring now to FIGS. 1 and 2, operation of the context analysis engine 13 is further detailed for user activity with web pages and instant messages, respectively. In the continuous monitoring and analysis of computer-based activity by the user, context analysis engine 13 begins its process at 111 (FIG. 1). The process (step 113) is responsive to the user visiting a webpage, especially one accessed through a given hyperlink. In Step 115, the context analysis engine 13 analyzes the subject webpage to obtain topics (keywords) and context (phrases preceding and succeeding the keywords) of the hyperlink.

In turn, step 117 of context analysis engine 13 makes a record in database 19 for the given hyperlink. Step 117 records in that database record, the topic (keywords), context, URL and source of the given hyperlink. The source may indicate that the given hyperlink was in a recently received email message or IM message to the user, for example.

At Step 119, the context analysis engine 13 adds the topic (keywords) and context to the tally of the user's current environment. As mentioned previously, context analysis engine 13 maintains an ongoing tally of the user's environment/work space 31.

When the user leaves the subject webpage, steps 121 and 123 are responsive. Step 121 detects the user leaving the webpage of the given hyperlink and triggers step 123 to calculate time duration or other metrics of the user's activities with the webpage. Also at step 123, context analysis engine 13 records in the database record of the hyperlink, the metrics (such as time duration, and the like) of the user's visit to the webpage.

In a similar manner, FIG. 2 illustrates the process of context analysis engine 13 monitoring and analyzing user activities with respect to an instant message. The process begins at 211. After initialization at Step 211, Step 213 detects in the user's current work space (for example in a focus application) receipt of an instant message containing a hyperlink.

Whether or not the user acts on the received instant message or the hyperlink contained therein, Step 215 analyzes the content or webpage associated with the hyperlink (i.e., the content pointed to or otherwise connected by the hyperlink and that would result if the hyperlink were followed/acted on). In particular, Step 215 analyzes the hyperlink content for topic (keywords) and context (words surrounding or neighboring the keywords).

In turn, step 217 of context analysis engine 13 makes a record in database 19 for the subject hyperlink. Step 217 records in that database record, the topic (keywords), context, URL and source of the subject hyperlink. The source indicates that the given hyperlink was in a recently received instant message to the user.

Step 218 of context analysis engine 13 analyzes the received instant message for topic (keywords) and context (words neighboring the keywords). In turn, step 218 adds to the record in database 19 for the subject hyperlink, the topic (keywords) and context of the received instant message.

At Step 219, the context analysis engine 13 adds the topic (keywords) and context of the received instant message to the tally of the user's current environment. This assists in maintaining the ongoing tally of the user's current environment/work space 31.

In like manner to the examples of FIGS. 1 and 2, user activity with respect to other electronic content or other electronic communications viewed, received, browsed or visited by the user is similarly continuously monitored and analyzed by context analysis engine 13.

Turning now to the example of FIG. 3, processing by the recommendation engine 17 is illustrated. The example is for purposes of illustrating the principles of the invention and not limitation of the particular implementation. Here the user is working on (composing) a PowerPoint® presentation for example, so a pertinent presentation application is in focus in the user's work space 31. The context analysis engine 13 sets the user's current environment tally to "dividend, stocks, buy, growth, ABC" for example based on keywords found in the user's current work space 31 (words in the content that the user is composing and working with).

Say that the user receives an instant message and that the instant message indicates "check out what they say about our stock here: www.forbes.com/practices.html". The user, at the moment, does not have time to look at the hyperlink received in this instant message and ignores the instant message. In accordance with the process of FIG. 2, the context analysis engine 13 recognizes existence of a hyperlink in the instant message, connects to the hyperlinked webpage of the forbes.com site, and scans the html (resulting webpage). Known techniques are utilized to accomplish such. In turn, the context analysis engine 13 logs the hyperlink in database 19, i.e., sets or updates a database record for the hyperlink to indicate topic (keywords) and context of the hyperlinked contents/webpage and that of the instant message. Thus it is the analysis of the resulting content (linked webpage in this example) that is key to embodiments of the present invention and not the text/keywords within a URL.

Context analysis engine 13 not only employs link detection techniques but also techniques for analysis of instant message context and topic in addition to techniques for analyzing the hyperlinked webpage context and topic regardless of the user action (i.e., clicking on the link). Many known or common such detection and analysis techniques are suitable.

In the example, the www.forbes.com/practices.html webpage (resulting webpage contents) contains or has as keywords "stocks, dividend, mutual funds, investing, loaded funds, ABC". Context analysis engine 13 thus updates the pertinent record (for the subject hyperlink) in database 19 to indicate "stocks, dividend, mutual funds, investing, loaded funds, ABC" for the topic and context. Context analysis engine 13 also indicates in that database record that the source of the subject hyperlink was an instant message. Likewise, context analysis engine 13 updates the database record to indicate at least "stocks" for the topic and context of the received instant message. Lastly, the context analysis engine 13 adds "ABC" to the tally for the user's current environment. This updates the user's current environment tally to "dividend, stocks, buy, growth, ABC, ABC" for example.

Returning to FIG. 3, the user may initiate a "Recommend Hyperlinks" function 23 to obtain optimal links to insert into his presentation content. In one embodiment, this is accomplished as follows.

First the user indicates a topic of interest such as topic of the current contents that he is composing (in the example, topic of the presentation contents). To make this indication, the user highlights word(s) 35 in his work space 31 where he would like to insert or otherwise create a hyperlink In the example of FIG. 3, the user has highlighted "ABC" for this purpose. This effectively initializes a command to the recommendation engine 17.

Next the user right clicks the highlighted area 35, and recommendation engine 17 responds by displaying an option "Recommend hyperlinks" 23 in a drop down menu. Other user interface implementation is suitable. Upon user selection of this menu option 23, recommendation engine 17 forms a query of database 19 using the highlighted words 35 as the topic of the search. To place the highlighted words 35 in context, recommendation engine 17 may extract further words/phrases/lines before and after the highlighted words 35 in the user's work space 31 (e.g., presentation being composed). Recommendation engine 17 queries database 19 using the user-input topic (highlighted words 35) and computer extracted context words/terms (from the user's current focus application/work space 31).

Database 19 is configured accordingly by known means and techniques. For example database 19 is indexed or otherwise structured and programmed for retrieval of stored records by keywords (topic), context terms, source, etc. In some embodiments, database 19 is a relational database. Other configured databases or database schemas are suitable.

The query submitted by recommendation engine 17 searches the database 19 for hyperlinks stored there having topic (keywords) and context matching the user-input topic (highlighted words 35) and computer extracted context terms. From the database search results, recommendation engine 17 obtains a set or list of qualified (matching) hyperlinks. Recommendation engine 17 orders the obtained hyperlinks according to respective relevance based on the user's current environment tally. Alternatively, Recommendation engine 17 orders the obtained hyperlinks according to a metric used in the database 19 records. Various relevance scoring algorithms and techniques are suitable. The recommendation engine 17 displays the resulting ordered list of qualifying hyperlinks 25 in a user interface window 37 as illustrated in FIG. 3.

The displayed list is formatted such that the user can further filter or narrow the results on metrics surrounding his prior activities such as Duration (time spent viewing or visiting the hyperlink content), Last visited (date), or Source of the link. The duration value may indicate level of usefulness of the corresponding content/webpage. The source may be important as the user may not remember when he saw the link of interest, but remembers where or in which program application he saw the link of interest (e.g., in an instant message that he ignored at the time, as in the example).

In the illustrated example of FIG. 3, the Source being "Dynamic" specifies that the corresponding hyperlink originated from a Social Media/Networking personalized search engine/system or other search engine/system. The "User based" value for Source indicates that the user opened a browser and visited the subject hyperlink in the past. The Source being indicated as "Email" means that the hyperlink was found in an email message of the user (sent or received), whether or not read or selected or otherwise interacted with by the user. The Source being indicated as "IM" means that the hyperlink was found in an instant message of the user (sent or received), whether or not read or selected or otherwise interacted with by the user.

Upon the user selecting one of the listed hyperlinks 25, recommendation engine 17 automatically populates the link (as hypertext) into the user highlighted words 35 or corresponding location.

In the example of FIG. 3, because the user-highlighted word 35 was "ABC" and context analysis engine 13 derived "dividend" as a subtopic, a link to abc.com was not chosen as a qualifying recommendation candidate where the abc.com page does not have information on ABC dividend. But abc.com/investor/ . . . does have content about ABC's dividend, thus the query search results include corresponding hyperlinks to abc.com/investor as qualifying recommendation candidates 25 for recommendation engine 17 to list in window 37.

With reference now to the "Dynamic search" feature 39 in the illustrated user interface of FIG. 3, a picklist or drop down selection list of dynamic search targets is provided. Other user interface implementation is suitable. The picklist/selection list may contain options such as Twitter, Facebook and other social networking sites or social media sites/systems, for non-limiting example. Upon user selection of one of these social networking sites, context analysis engine 13 searches the selected site 21 for one or more groups with pages to scan for potential relevant links with respect to the user's current environment tally (topic and context). The context analysis engine 13 scans links on the social network group account page to find the optimal set of links relating to the user's current environment and highlighted words 35.

For example, say the user selected Twitter (generally referenced 21 in FIG. 5b) from the Dynamic search feature 39 options. The context analysis engine 13 in turn finds the twitter site twitter.com/ABC_PR. The context analysis engine 13 did not choose other twitter sites because the tweets at those sites were not all about ABC, stock, dividend, etc. matching the user's current environment tally and highlighted topic words 35 ("ABC"). Recommendation engine 17 responsively merges the links found on the ABC_PR twitter site with the hyperlinks 25 displayed to the user in the ordered list in window 37. The links from the twitter site 21 displayed in window 37 include activity metrics, such as dates of Last visit, to allow for use of user's filtering options previously described.

Figure 4:
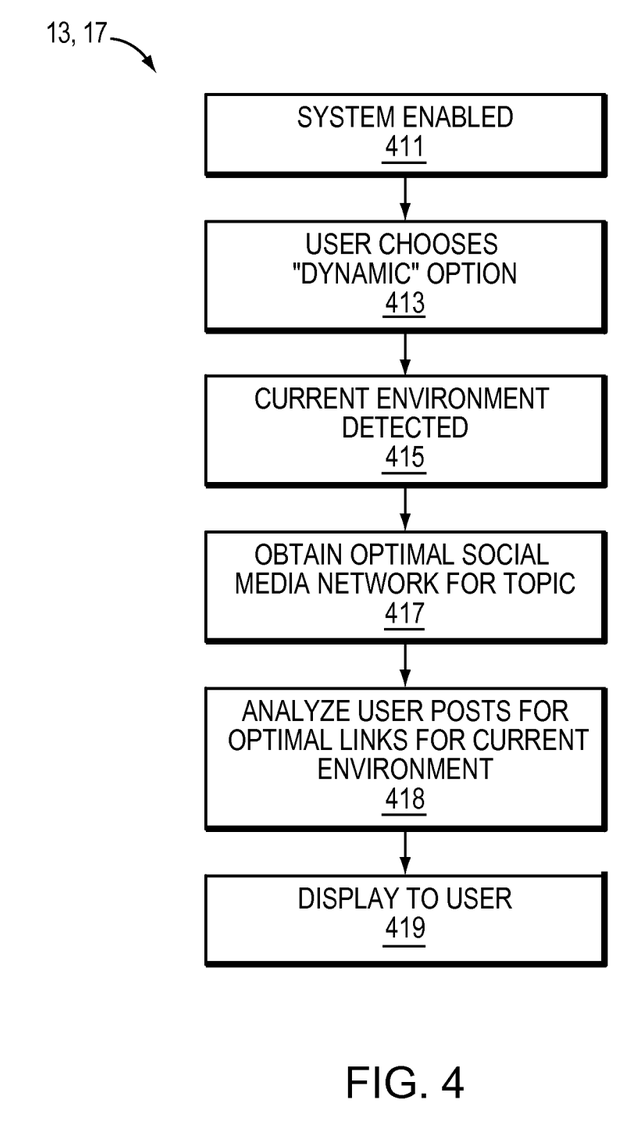
FIG. 4 is a flow diagram of a context analysis engine process for dynamically obtaining links for the recommendation engine in an embodiment.

FIG. 4 is illustrative of the foregoing process of context analysis engine 13 and recommendation engine 17 dynamically obtaining relevant hyperlinks for link recommendation to the user. The process is initialized at step 411. At step 413, recommendation engine 17 detects user selection and specification of the Dynamic search 39 option. Recommendation engine 17 triggers context analysis engine 13 which detects the user's current environment (including highlighted topic word 35, context and environment tally).

With the user's current environment in mind, context analysis engine 13 looks for groups at the user-selected social media network 21 (as specified by the Dynamic search 39 option) that are on topic. At step 417, context analysis engine 13 obtains optimal such subject media network groups. Then at step 418, context analysis engine 13 analyzes posts by these groups, and in particular finds and analyzes hyperlinks in the posts that match the topic and context of the user's current environment. Context analysis engine 13 forwards the relevant matching hyperlinks and any corresponding activity metrics data to recommendation engine 17 to display in window 37 (step 419).

Figure 5A:
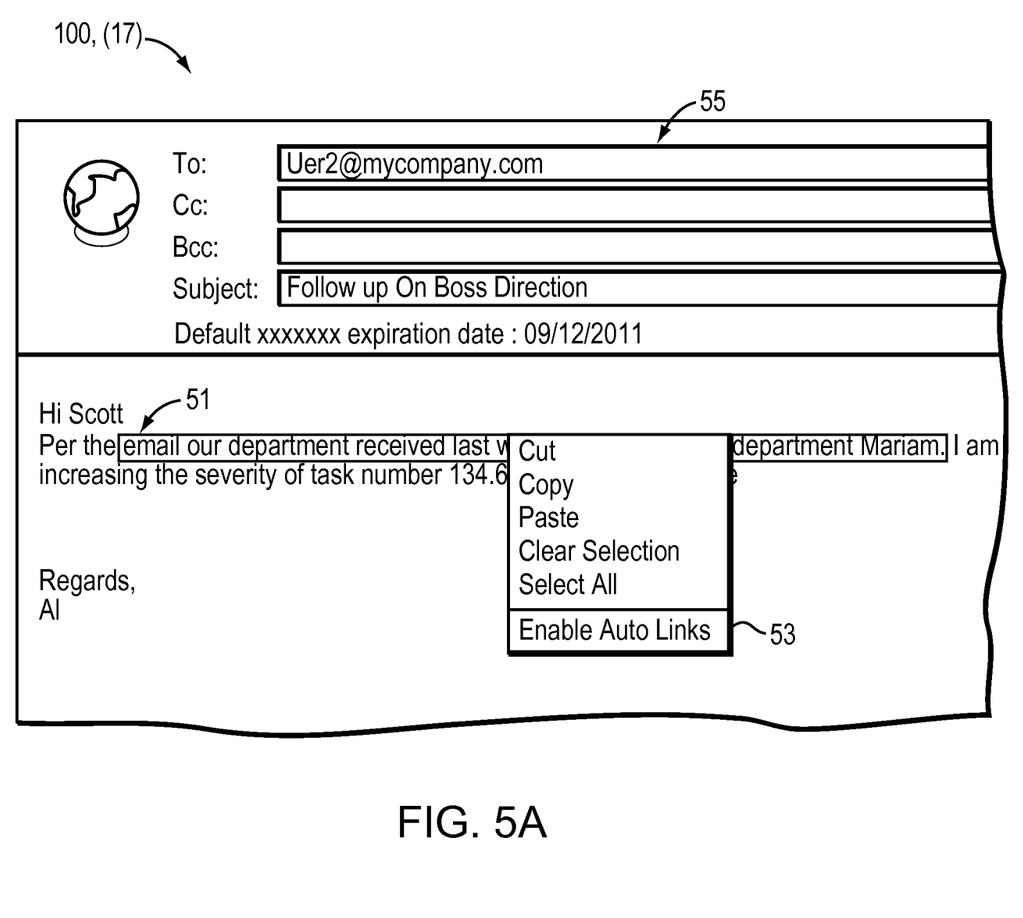
FIGS. 5A and 5B are schematic illustrations of an embodiment providing hyperlink recommendations in an email environment or similar work space.
Figure 5B:
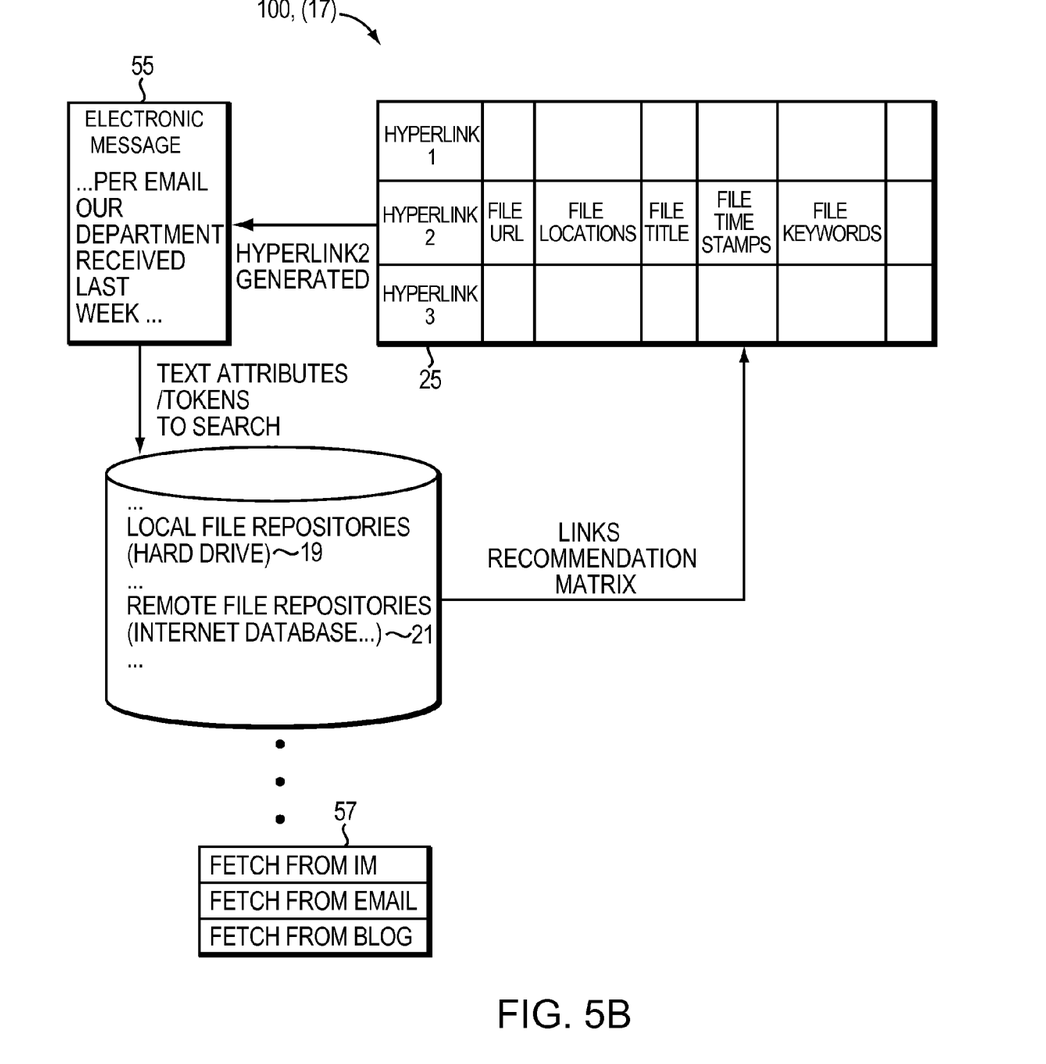

Turning now to FIGS. 5a and 5b, another example of operation of recommendation engine 17 is illustrated. Suppose the in-focus application of the user in this example is an email program. The user opens an incoming email message 55 that he has received. The opened email message 55 has some text referring to a prior communication containing a link. The text could be something like " . . . the link in that email I sent you last week". The user now wishes to attempt to find the subject link.

To initiate use of the recommendation engine 17 to find the subject link, the user highlights and selects (for example, right clicks) the subject text 51. In response, recommendation engine 17 displays in the user interface an appropriate menu selection or the like, such as "Enable Auto Links", 53. Upon user selection of option 53, recommendation engine 17 parses the highlighted text 51 and determines search criteria such as sender of the email, time period ("last week"), etc. Recommendation engine 17 searches database 19 for hyperlinks having source=email and the determined sender and time period (or other context) criteria. From the search results, recommendation engine 17 displays candidate hyperlinks 25 to the user. In one embodiment, the user receives from the recommendation engine 17 output candidate hyperlinks 25 that are based on previous emails, chats etc. from the sender and can choose from those links. In another embodiment, a secondary dialog box 57 may be displayed to suggest filtering by source of links, such as "Fetch from IM", "Fetch from Email" and "Fetch from Blog" for example. FIG. 5b is illustrative.

Upon user selection of one of the displayed candidate hyperlinks 25, the recommendation engine 17 retrieves (follows the hyperlink 25) and displays the linked content for the user. In one embodiment, recommendation engine 17 displays the linked content in the vicinity of the subject highlighted text 51 as in substitution therefore.

Similarly, a user may utilize the link recommendation system 100 of the present invention in composing outgoing emails as follows. Say the user in this scenario is creating (composing) a new email message and has populated the To, cc and bcc fields and subject line. He types some text for the contents of the email message and decides that he wants to include a hyperlink in the message contents. To efficiently obtain a hyperlink, he employs the recommendation engine 17 to see a list of relevant links 25.

For instance, if the user highlights the words in the subject line and operates the user interface to "Enable Auto Links" 53, the recommendation engine 17 uses the highlighted words in the subject line as the user-input topic and context. In turn, the recommendation engine 17 searches database 19 for prior communications or electronic content with similar topic/context. From the search results, recommendation engine 17 lists and displays relevant hyperlinks 25 from which the user can choose to insert into the email message contents that he is composing.

If the user highlights the names in the To, cc and/or bcc fields (or distribution list) and operates the "Enable Auto Links" feature 53, then recommendation engine 17 uses the highlighted names as the user-input topic and context. Recommendation engine 17 searches database 19 for prior communications or electronic content with any of these names (from the subject topic/distribution list). From the search results, recommendation engine 17 lists and displays to the user relevant hyperlinks 25 from which he can choose for insertion into the email message contents that he is composing.

From the displayed list(s) of relevant hyperlinks 25 (link recommendations by recommendation engine 17), the user may select one of the candidate hyperlinks 25. Upon user selection, recommendation engine 17 populates the subject email message with the user-selected hyperlink 25 (i.e., hypertext of the corresponding URL).

Accordingly, methods, systems and computer apparatus embodying the present invention have elements of:

capturing an activity content link, where the activity content link comprises a hyperlink associated with an activity of the user (e.g., URL history links, links in emails the user has browsed, links in IM's, links in social network content, links in social bookmarking content, etc.);

generating a metric based on said activity (e.g., time spent/duration of viewing the content);

receiving user-selection of text (e.g., user highlighted text in a word processing document, webpage, email message, electronic content, and the like);

extracting a context of the user-selected text (e.g., extract n lines above and below the selected text); and sending a recommended link to a client based on said metric and said context.

Capturing activity content links further includes analyzing the source for context and logging the source of the link (e.g., an instant message to the user) for context. Logging the source of where a link came from enables subsequent scoping to retrieve the correct (and relevant) hyperlink. The hyperlinks 25 recommended by embodiments of the present invention are scoped to the user's prior activities, activity metrics (e.g., duration of webpage visit) and context of those activities. Hyperlinks associated with the user's emails, social network content, etc. are included in the hyperlink recommendations 25. Restated, the hyperlinks 25 recommended are based on the user's personal activity history, and embodiments 100 enable the user to subsequently look up and find links that he had prior contact with or exposure to.

Embodiments also put the user in control of the topic and context (user-selection of current text) by which the invention system 100 searches for hyperlinks and makes link recommendations. Thus embodiments yield personalized results.

In contrast to existing art, embodiments of the present invention are not recommending links to websites based on which websites are "similar" to websites that the user is currently viewing or has previously visited. Embodiments are not recommending links 'related' to a website's context or email's context that the user has viewed but rather recommending links that the user has previously visited and links in previously received emails/other communications (i.e., links that the user has been in contact with or exposed to before and that the user is now subsequently in need of finding).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While this invention has been particularly shown and described with references to example embodiments thereof, it will be understood by those skilled in the art that various changes in form and details may be made therein without departing from the scope of the invention encompassed by the appended claims.

For example, some embodiments provide the ability of recommending a specific bucket (set) from which the recommended links 25 are drawn from in a particular string of keywords. This may be accomplished by having an association between the user's prior activities and the repository 19, 21 that a potential link could come from.

Other embodiments may have the option of selecting a combination of fragmented keywords that the system 100 processes effectively as representative of a single topic and corresponding context. The identification of such fragmented keywords could be based on specific font, color, or simple user's highlights.

There may be other interface controls for the user to narrow scope of the results (list of recommended links 25) to common sources and additional filtering on the activity metrics surrounding previously visited hyperlinks.

What is claimed is:

1. A computer-implemented method of recommending a list of hyperlinks, comprising:
   maintaining a database of hyperlinks associated with activities in the past of a user, said activities including passive receipt of hyperlinks;
   receiving a selection of text, the selection being by the user from a current workspace in which the user is composing content;
   extracting from the user's current workspace a context of said selection of text;
   searching the database for hyperlinks based on at least the context of said selection of text, wherein maintaining the database includes:
      (i) throughout different workspaces of the user, capturing different activity content links, each activity content link comprising a respective hyperlink associated with a respective activity of the user, and
      (ii) for each activity content link, generating a metric based on said respective activity;
   from results of said searching, displaying to the user a list of one or more recommended hyperlinks based on said context and the metric of the respective activity associated with the hyperlink; and
   upon user command, substituting the selection of text in the content being composed by the user with one of the displayed recommended hyperlinks such that the one displayed recommended hyperlink is inserted into and populates the content being composed in place of the selection of text.

2. The method as claimed in claim 1 wherein the hyperlinks in the database being from activity content links include:
   URL history links,
   links in emails to the user,
   links in emails from the user,
   links in instant messages to the user,
   links in instant messages from the user,
   links in electronic communications to the user,
   links in electronic communications from the user,
   links in social network content, and
   links in social bookmarking content.

3. The method as claimed in claim 1 wherein the respective activity associated with the hyperlink is the user viewing content, and wherein the metric includes amount or duration of time the user spent viewing the content.

4. The method as claimed in claim 1 wherein the selection of text is user highlighted text in any of: a word processing document, a web page, an email message, a text message, an electronic presentation, an electronic communication and other electronic content.

5. The method as claimed in claim 1 wherein extracting extracts a plurality of words before and after the selected text.

6. The method as claimed in claim 1 wherein the user's current workspace is separate from the different workspaces of the user.

7. The method as claimed in claim 6 wherein the user's current workspace is separate in time and space from the different workspaces.

8. The method as claimed in claim 1 wherein the selection of text is indicative of or representative of a topic of the user.

9. The method as claimed in claim 1 wherein said displaying displays multiple recommended links ordered by the metric or filterable by the metric.

10. The method as claimed in claim 1 further comprising:
   upon user command, searching a social networking site for hyperlinks relevant to the context, and displaying said hyperlinks as recommended hyperlinks to the user.

11. Computer apparatus recommending hyperlinks, comprising:
   a processor;
   a memory coupled to the processor and holding a database of hyperlinks that are associated with activities in the past of a user, said activities including passive receipt of hyperlinks;
   a user interface executed by the processor and receiving a selection of text, the selection of text being by the user from a current workspace in which the user is composing content, and resulting in selected text;
   a recommendation engine operatively coupled to the user interface, the recommendation engine executed by the processor and extracting from the user's current workspace a context of said selected text, and the recommendation engine searching the database for hyperlinks based on at least the context of said selected text, wherein a context analysis engine executed by the processor maintains the database by:

(i) throughout different workspaces of the user, capturing different activity content links, each activity content link comprising a respective hyperlink associated with a respective activity of the user, and (ii) for each activity content link, generating a metric based on said respective activity; and from results of said searching, the recommendation engine displaying in the user interface to the user, a recommended hyperlink based on said context and the metric of the respective activity associated with the hyperlink, and the recommendation engine, upon user command, substituting the selected text in the content being composed by the user with the displayed recommended hyperlink, such that the displayed recommended hyperlink is inserted into and populates the content being composed in place of the selected text.

12. The Computer apparatus as claimed in claim 11 wherein the hyperlinks in the database include:

URL history links,
links in emails to the user,
links in emails from the user,
links in instant messages to the user,
links in instant messages from the user,
links in electronic communications to the user,
links in electronic communications from the user,
links in social network content, and
links in social bookmarking content.

13. The Computer apparatus as claimed in claim 11 wherein the respective activity associated with the hyperlink is the user viewing a content, and wherein the metric includes amount or duration of time the user spent viewing the content.

14. The Computer apparatus as claimed in claim 11 wherein the selection of text is user highlighted text in any of: a word processing document, a web page, an email message, a text message, an electronic presentation, an electronic communication and other electronic content.

15. The Computer apparatus as claimed in claim 11 wherein the recommendation engine extracting extracts a plurality of words before and after the selected text.

16. The Computer apparatus as claimed in claim 11 wherein the user's current workspace is separate in time and space from the different workspaces.

17. The Computer apparatus as claimed in claim 11 wherein the selection of text is indicative of or representative of a topic of the user.

18. The Computer apparatus as claimed in claim 11 wherein the recommendation engine displays in the user interface multiple recommended links ordered by the metric or filterable by the metric.

19. The Computer apparatus as claimed in claim 11 wherein the context analysis engine and the recommendation engine further:

upon user command, search a social networking site for hyperlinks relevant to the context, and display said hyperlinks as recommended hyperlinks to the user.

20. A computer program product recommending hyperlinks, comprising:

a non-transitory computer readable storage medium having computer readable program code embodied therewith, the computer readable program code comprising program instruction to a computer to:

capture an activity content link, wherein the activity content link comprises a hyperlink associated with an activity of a user;

generate a metric based on said activity;

from (i) the hyperlink of the captured activity content link and (ii) the generated metric, form a database of hyperlinks;

subsequently receive a user-selection of text from a current workspace of the user in which the user is composing content, the user-selection of text being indicative of a topic and resulting in user-selected text;

extract from the user's current workspace a context of the topic;

search the database for hyperlinks based on the topic and the context;

from results of the search, display to the user link recommendations formed of one or more hyperlinks from the database, said display being in a manner filterable on the metric; and upon user command, substitute the user-selected text in the content being composed by the user with one of the hyperlinks corresponding to a displayed link recommendation, such that the one hyperlink is inserted into and populates the content being composed in place of the user-selected text.

* * * * *